Dec. 13, 1960
F. ARENA
2,964,263
AIRCRAFT CONSTRUCTION
Filed Aug. 26, 1957
5 Sheets-Sheet 1
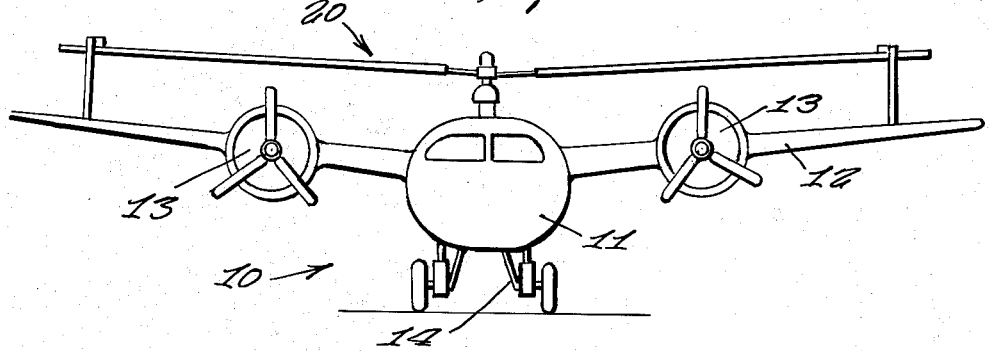
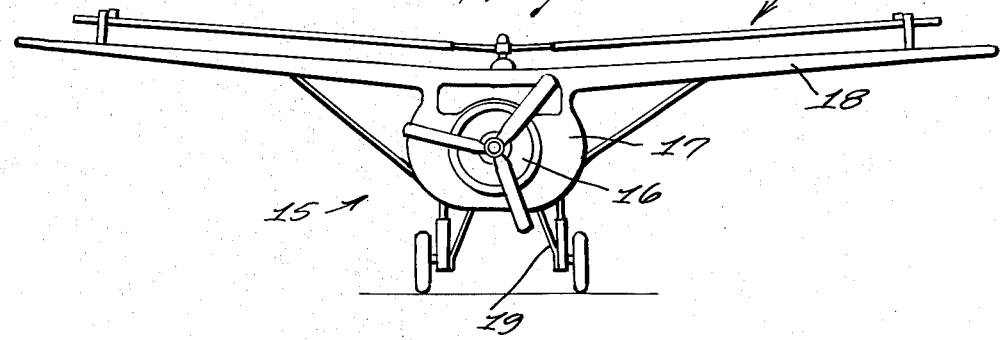
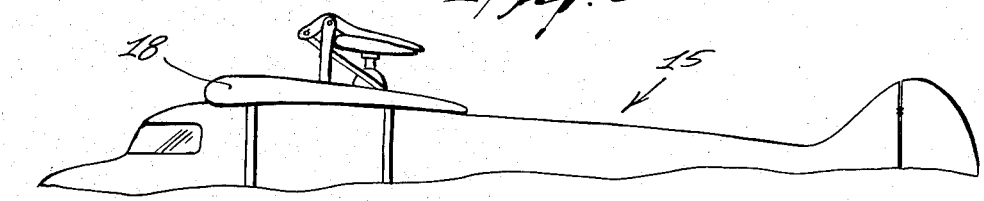
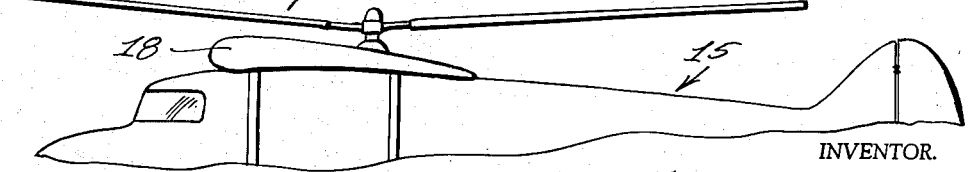
INVENTOR.
FRANK ARENA
BY
Carl Miller
ATTORNEY Dec. 13, 1960

F. ARENA 2,964,263

AIRCRAFT CONSTRUCTION

Filed Aug. 26, 1957

INVENTOR.
FRANK ARENA
BY
Carl Miller
ATTORNEY

Dec. 13, 1960   F. ARENA   2,964,263
AIRCRAFT CONSTRUCTION
Filed Aug. 26, 1957   5 Sheets-Sheet 3

INVENTOR.
FRANK ARENA
BY
Carl Miller
ATTORNEY

Dec. 13, 1960

F. ARENA 2,964,263

AIRCRAFT CONSTRUCTION

Filed Aug. 26, 1957

INVENTOR.
FRANK ARENA
BY
Carl Miller
ATTORNEY

Dec. 13, 1960 F. ARENA 2,964,263
AIRCRAFT CONSTRUCTION
Filed Aug. 26, 1957 5 Sheets-Sheet 5

INVENTOR.
FRANK ARENA
BY
Carl Miller
ATTORNEY

United States Patent Office 2,964,263
Patented Dec. 13, 1960

2,964,263

AIRCRAFT CONSTRUCTION

Frank Arena, 2250 Wallace Ave., Bronx, N.Y.

Filed Aug. 26, 1957, Ser. No. 680,269

6 Claims. (Cl. 244—6)

This invention relates to aircraft and, more particularly, to auxiliary equipment therefor.

One of the deterrent factors to wide acceptance by the general public of learning to fly, is the fear of take-off, landings, and engine loss of power while in flight; these are the major causes of flight accidents. Accordingly, an object of the present invention is to provide an auxiliary apparatus which will permit short take-off and landings and safety in landing (by autorotation) in the event of engine failure.

Another object of the present invention is to provide auxiliary apparatus for aircraft that is in the form of a two blade propeller which is mounted substantially parallel to and vertically spaced above the aircraft wing so as to provide additional lift when not in use, and which is automatically releasable to permit it to be rotated by a drive from the main power plant of the plane, or autorotated by the motion of the aircraft when not in drive. The engine power to the rotor blade is controlled by the clutch and transmission. When the clutch is engaged, the rotor blade will be powered and give extra lift. When disengaged, it will drive the propeller and the rotor will be in autorotation. The rotor can be driven or put in autorotation and/or used in combination with the thrust propeller, for the most advantageous combination of uses for the particular flight problem.

Still another object of the present invention is to provide auxiliary apparatus of the type described in which the blades are individually rotatable about their longitudinal axes at a different rate so as to enable the blades to be inclined to the proper pitch when being adjusted from the normally stationary position to the operative rotating position.

All of the foregoing and still further objects and advantages of this invention will become apparent from a study of the following specification, taken in connection with the accompanying drawing, wherein:

Figure 1 is a front plan view of an aeroplane made in accordance with one form of the present invention, embodying the aforementioned auxiliary apparatus;

Figure 2 is a view similar to Figure 1, of a modified form of aeroplane construction embodying the same auxiliary apparatus;

Figure 3 is a side elevational view of the device shown in Figure 2 with the auxiliary apparatus in the stationary, additional lift furnishing position;

Figure 4 is a view similar to Figure 3, showing the auxiliary apparatus in the released rotating propelling position;

Figure 5:
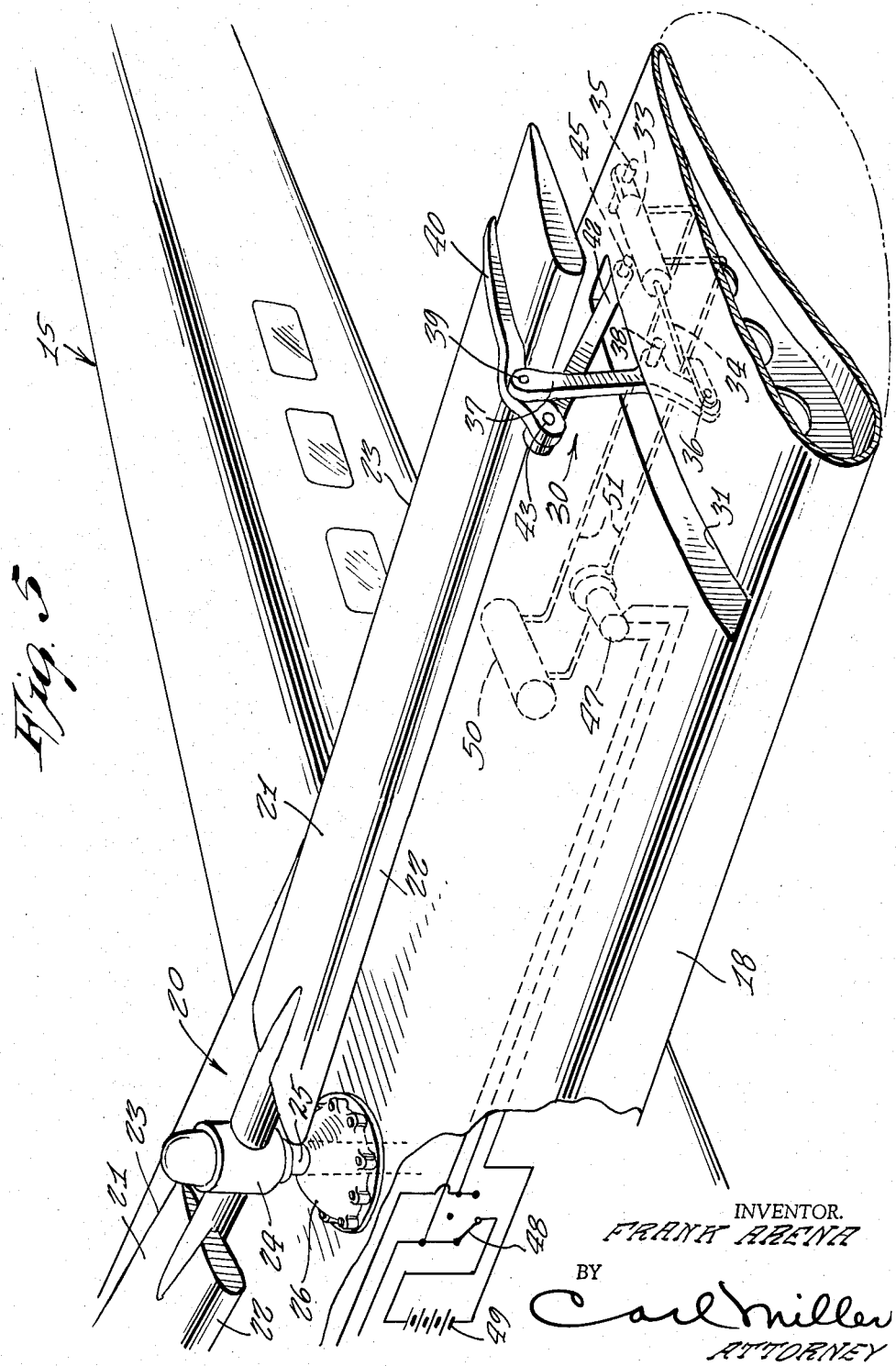
Figure 5 is an enlarged fragmentary perspective view of the aircraft shown in Figure 2.
Figure 6:
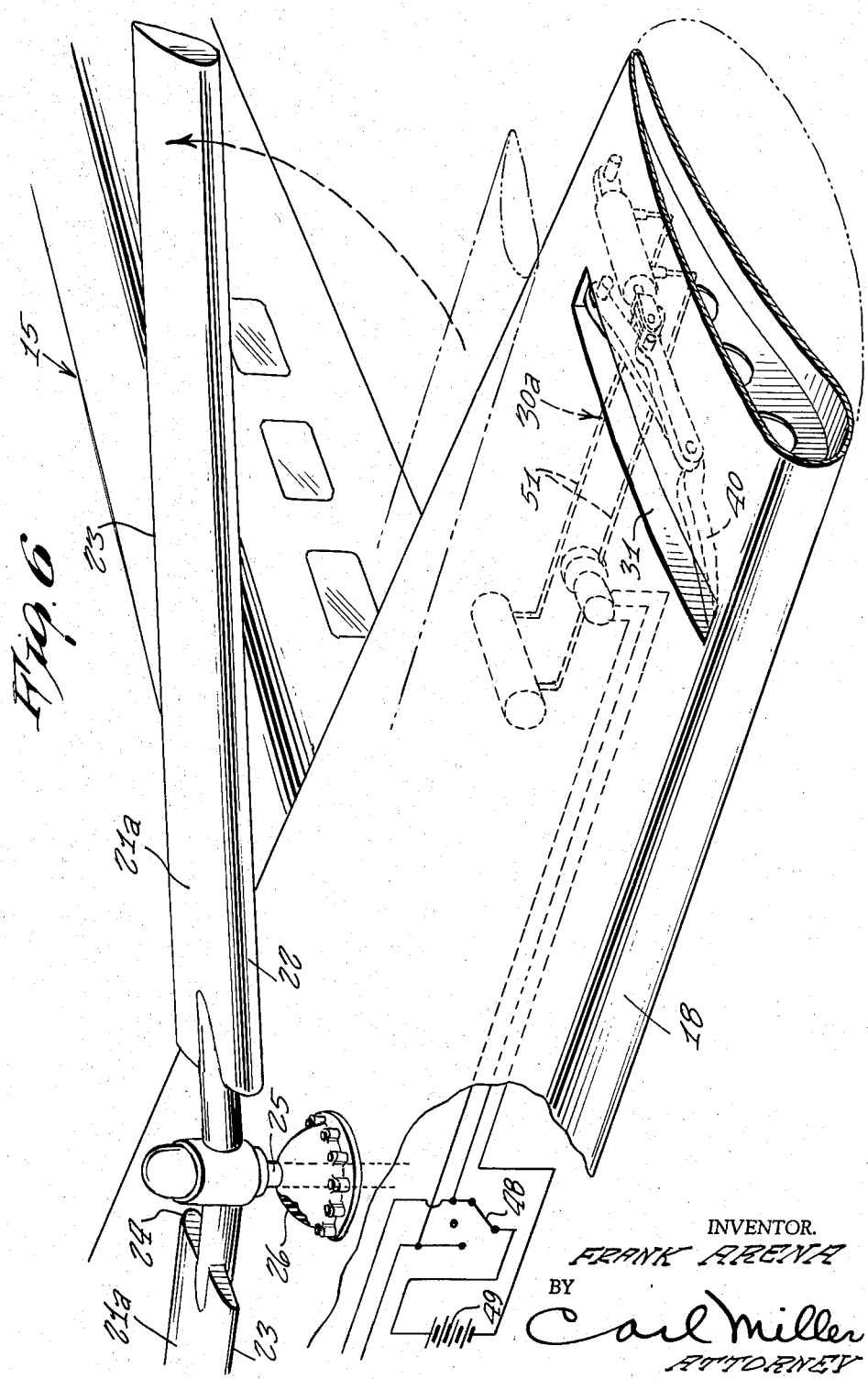
Figure 6 is an enlarged fragmentary perspective view of the aircraft shown in Figure 4.

Referring now to the drawing, and more particularly to Figure 1 thereof, an aeroplane 10 made in accordance with the present invention is shown to include a fuselage 11, a wing 12 having twin engines 13, and the landing gear 14. The auxiliary apparatus 20 made in accordance with the present invention is shown in operative position above the wing 12.

In Figure 2 of the drawing, a modified form of aircraft construction 15 is shown wherein the single engine 16 is mounted within the front end of the fuselage 17, a wing 18 extending across the top of the fuselage, and a landing gear 19 disposed therebeneath. In a similar manner, the auxiliary apparatus 20 is disposed in rotatable engagement upon the top of the fuselage, as will be hereinafter described.

Referring now more specifically to Figure 5 of the drawing, the auxiliary apparatus 20 is shown to include a pair of blades 21, each one of which has a leading edge 22 and a trailing edge 23. The inner ends of the blades are secured to a rotatable hub 24 that is adapted to be driven by a rotor shaft 25 through a flexible mounting 26. The blades 21 are normally secured in spaced parallel relationship with the wing 18 with both leading edges 22 facing toward the front of the plane. Thus, these blades furnish additional lift to the aircraft which enables the plane to land and take off at lower speeds and generally increases the safety of the unit. However, as will be hereinafter described, these blades are relatively rotatable about their longitudinal axes so as to permit them to function as rotor blades for propelling the aircraft when needed.

When secured in the normal parallel relationship with the wing, the blades are disposed in the position shown in Figure 5 by means of linkage 30 that may be controlled from within the aircraft. This linkage 30 is disposed for movement within an opening 31 at each end of the wing by means of a hydraulic cylinder 33 that is supplied with pressure fluid from a reservoir 50 through supply lines 51 by means of a pump 47 that may be electrically operated from a battery 49 upon the closing of a manually operated switch 48. The cylinder 33 is rotatably mounted at one end by means of a pivot 35 upon the wing, while the opposite end thereof includes a retractable plunger 34 which is pivotally connected by means of a pin 36 to one end of a bell crank lever 37. This lever is rotatably supported upon the wing intermediate its length by means of trunnions 38, while the opposite end thereof is provided with a pivot pin 39 for rotatable engagement with a lock lever 40. The free end of the lever 40 is rotatably connected to one end of a connecting link 42 by means of a pivot pin 43. The opposite end of this connecting link 42 is provided with trunnions 45 for rotatable engagement with fixed parts of the wing 18. In a normal position, the lock lever 40 overlies the outer edge of the associated blade 21 so as to prevent rotation of the blades and to secure the blades in proper spaced parallel relationship with the main wing 18. However, in response to the closing of the switch 48, the hydraulically operated plunger 34 is adapted to be retracted inwardly of the cylinder 33 to effect rotation of the various links and levers so that the linkage will assume the collapsed position 30a within the opening 31 of the wing, thus releasing the blades 21.

Figure 7:
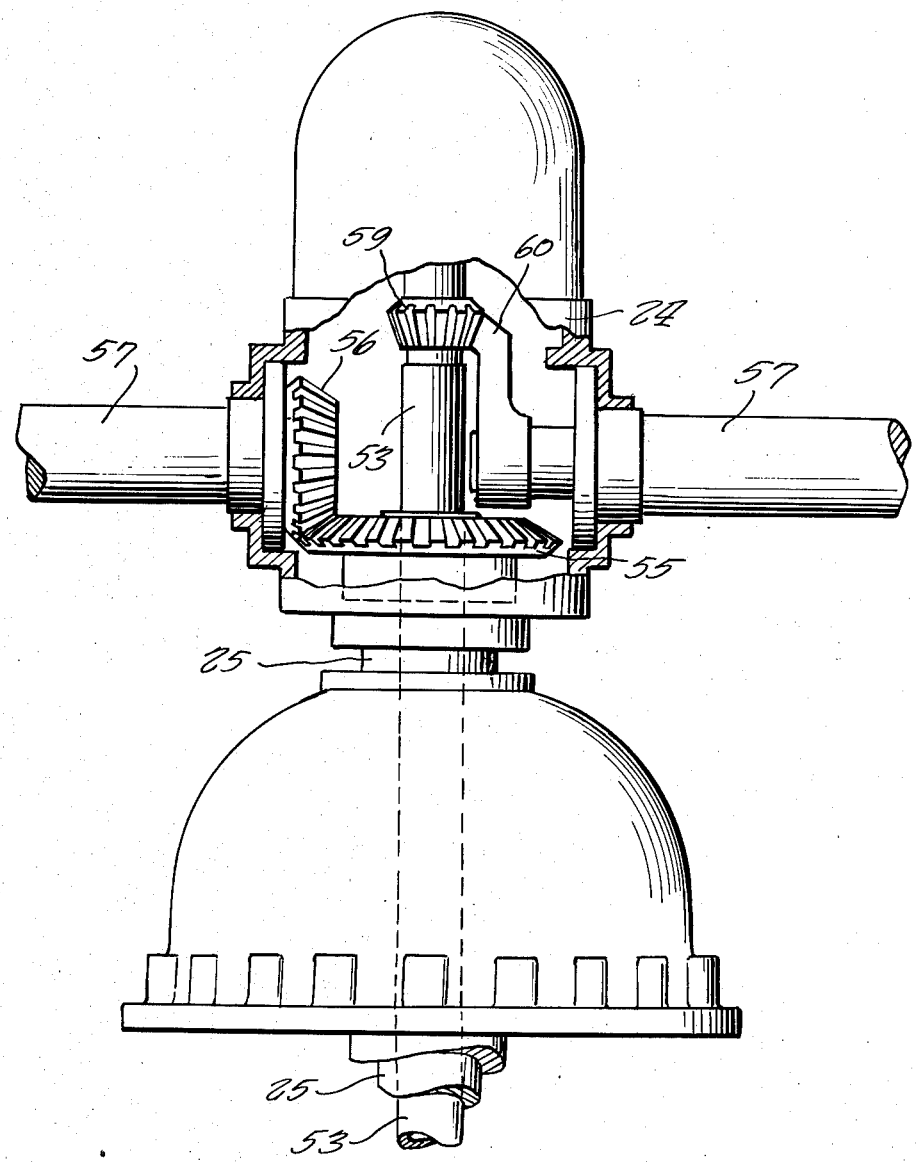
Figure 7 is an enlarged front elevational view, with parts broken away, of one of the operating components of the present invention.
Figure 8:
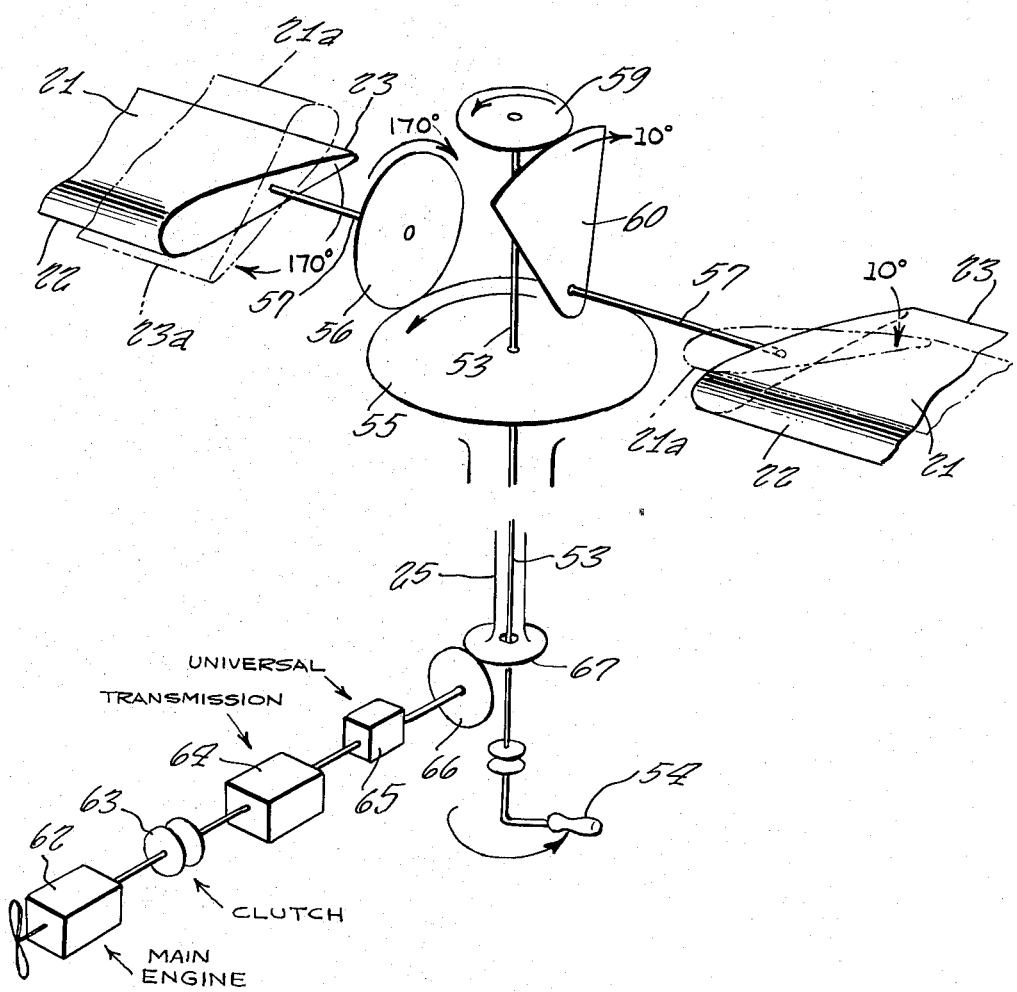
Figure 8 is a perspective diagrammatic view showing the manner in which certain parts of the present invention operate.

In order that the rotor blades 21 may be effectively used to propel the aeroplane in flight, the pitch of one of the blades 21 must be completely reversed, while the pitch of the other blade must be slightly altered. Referring now to Figure 8 of the drawing, suitable gearing is shown for effecting this relative movement. A bevel gear 55 is mounted upon the control shaft 53 within the hub 24, as is also shown in Figure 7. This bevel gear 55 is in meshing engagement with a smaller bevel gear 56 secured to the adjacent end of one of the blade shafts 57. The upper extremity of the control shaft 53 is provided with a smaller bevel gear 59 that is in meshing engagement with a sector gear 60 which is mounted upon the shaft 57 of the other blade. Thus, in response to rotation of the handle 54, which operates the conventional hydraulic blade actuating mechanism, it is possible to effect rotation of one blade 21 about its longitudinal axis through an angle approximating 170°, while the other blade 21 is rotated in an opposite direction about its longitudinal axis through an angle approximating 10°. It will thus be recognized that the pitch of both blades will then be identical, with the leading and trailing edges thereof in proper relationship to maintain the aircraft in flight during rotation of the blade supporting hub 24. Rotation of the hub is imporated by means of the rotor shaft 25 which encloses the hydraulic control 53 which actuates the blades, as shown in Figure 8. The rotor shaft 25 is rotated by the main power plant engine 62 that acts through a clutch 63 and transmission 64 to supply power through the universal coupling 65 to rotate the bevel gear 66 in meshing engagement with a mating bevel gear 67 secured to the rotor shaft 25.

The operation of the apparatus will now become apparent. In normal landing and take off, the rotor blades are maintained in the secured position shown in Figure 5. However, when the additional power of the rotor blades is required, the switch 48 is closed so as to release the blades 21 for rotation by the rotor drive shaft 25. Simultaneously therewith, the hydraulic control handle 54 is operated to reverse the pitch of the respective blades 21 so as to enable them to supply the rotor blade propelling power to the aircraft.

It will be further noted that my invention allows rapid convertibility from the fixed wing aircraft to the rotor wing aircraft for the most advantageous and selective use by the operator. The rotor blade drive shaft 25 can be actuated forward, backward, and sideway, for a helicopter type control.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. In an airplane having a fuselage, a wing, and propelling means, auxiliary air foil and propelling means comprising, in combination, a hub supported above said wing, a pair of diametrically oppositely extending blades supported at one end upon said hub, means securing said blades in a normally spaced parallel relationship with said wing, means for releasing said securing means, means for effecting rotation of said hub about an axis substantially perpendicular to said wing, said wing including indentations at each end, each extending transversely of the longitudinal axis of said wing, said securing means being supported within said indentations for a selective movement between an extended securing position with said blades and a retracted released position relative thereto, each said securing means comprising a bell crank lever having a mid portion pivotally supported within each one of said indentations of said wing, a locking lever pivotally carried intermediate its ends upon the outer extremity of said bell crank lever and having one elongated end normally overlying one of said blades, and a connecting link pivotally carried at one end upon said wing at a point spaced from said pivoted connection of said bell crank lever to said wing and pivotally connected at the opposite end to the opposite end of said locking lever.

2. In an aeroplane as set forth in claim 1, wherein said release means comprises a plunger supported within said wing adjacent to and parallel with each of said indentations, said plunger being pivotally connected to the opposite end of said bell crank, for effecting rotation thereof between an extended and a retracted position.

3. In an aeroplane as set forth in claim 2, wherein said plunger comprises a piston of a hydraulic cylinder, and said release means comprises an electrically operated pump for supplying pressurized fluid to said cylinder.

4. In an aeroplane as set forth in claim 3, further comprising means for rotating said blades about their respective longitudinal axes.

5. In an aeroplane as set forth in claim 4, wherein said rotating means comprises means for rotating each of said blades at a different rate.

6. In an aeroplane as set forth in claim 5, further comprising means controlling the movement of said rotor blade drive shaft in forward, backward, and sideway directions.

References Cited in the file of this patent

UNITED STATES PATENTS

| 1,688,186 | Humphreys | Oct. 16, 1928 |
| 2,094,105 | Myers | Sept. 28, 1937 |
| 2,703,210 | Myers | Mar. 1, 1955 |
| 2,792,189 | Altemus | May 14, 1957 |

FOREIGN PATENTS

| 966,032 | France | Sept. 28, 1950 |